Dec. 16, 1941.  C. F. SENKEWITZ  2,266,278
PEELER
Filed April 7, 1939

INVENTOR.
Charles F. Senkewitz
BY
ATTORNEY.

Patented Dec. 16, 1941

2,266,278

UNITED STATES PATENT OFFICE 2,266,278

PEELER

Charles F. Senkewitz, Dearborn, Mich.

Application April 7, 1939, Serial No. 266,574

2 Claims. (Cl. 30—280)

This invention relates to means for paring or peeling fruits and vegetables and has for its primary object to provide a peeler having a blade so constructed and arranged with respect to the handle that no special effort or care is required on the part of the operator to regulate the depth of the cut.

More specifically, the main object is to provide a peeler having a handle with a blade pivotally attached thereto and extending endwise therefrom, the blade having a knife edge directed toward the end of the handle, means between the knife edge and the handle for regulating the depth of the cut, and means for limiting relative movement between the blade and handle in order that pressure may be applied on the blade through the handle.

According to the invention the blade is formed with two parallel spaced portions integrally united at their ends, the two portions being angularly related such as to provide a V-shape when viewed in section. One of the blade portions has a knife edge directed toward the other portion, and the other portion has a bead formation for regulating the depth of the cut, and means adapted for pivotal attachment to a handle to support the blade for swinging movement about an axis parallel to and spaced from both portions. The blade and handle have coacting means for restricting relative pivotal movement between the blade and handle.

Other objects and advantages will become more fully apparent as reference is had to the accompanying drawing wherein the invention is illustrated, and in which.

Figure 1:
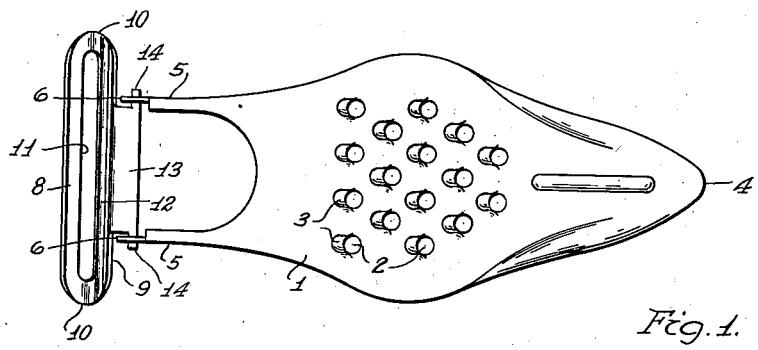
Fig. 1 is a plan view.
Figure 2:
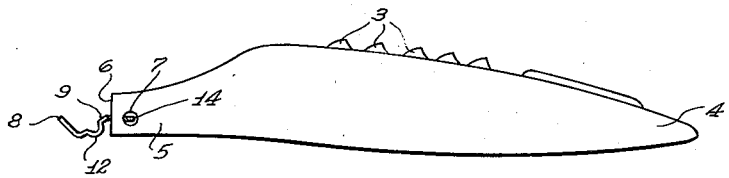
Fig. 2 is a side elevation.
Figure 3:
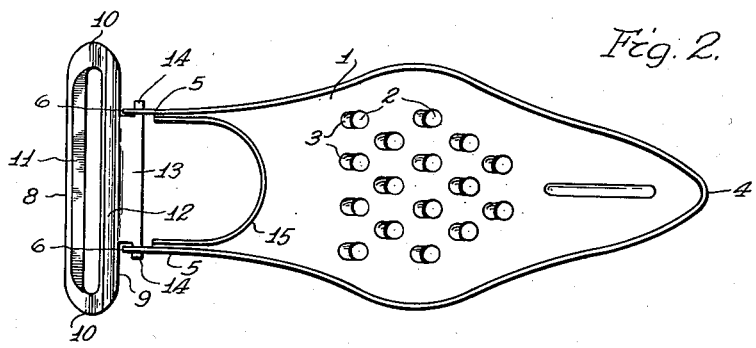
Fig. 3 is a bottom plan.

More particularly, 1 designates a handle formed of sheet metal and having a shape such that it may be conveniently grasped in the hand of the operator. In its top wall the handle has a multiplicity of apertures 2 and the metal adjacent respective apertures is struck upwardly to provide shredders 3. At the end 4 the handle is pointed to enable removal of cores from fruit, and at its other end is formed with a pair of arms 5. The arms 5 are formed with square ends 6 and aligned apertures 7.

Figures 4, 5:
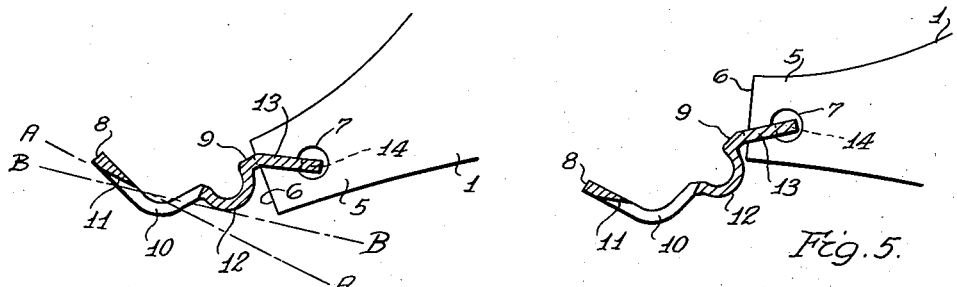
Figs. 4 and 5 are enlarged sections of the blade, illustrating a fragment of the handle.

The blade is composed of two spaced parallel portions 8 and 9, integrally united at their ends by portions 10, and angularly related to form a V-shape when viewed in transverse section as in Figs. 4 and 5. The edge of the portion 8 which is nearest the portion 9 is ground to provide a knife edge 11, and the portion 9 has a bead formation 12 extending parallel to the knife edge and related with the knife edge as hereinafter described. The portion 9 also has a projecting portion 13 angularly related to the portion 9, extending between the arms 5 and having pintles 14 extending through the apertures 7 to pivotally attach the blade to the handle.

The bead 12 is spaced from the plane of the knife edge 11, as is indicated by the line A—A of Fig. 4. Therefore, when the knife edge and the bead are both placed in contact with a surface represented by the line B—B, which might be the surface of a fruit or vegetable, the blade is in a position such that it tends to penetrate the fruit or vegetable. In this position, the edge of the blade portion 9 engages the square end 6 of the handle, to restrict further swinging movement of the handle, and to enable application of pressure on the blade through the handle. The line B—B also indicates that the bead and knife edge are so related that the lower corners of the arm ends 6 do not contact and pierce the fruit or vegetable during the paring operation.

The handle is formed of sheet metal as a stamping, is of concavo-convex section, and is shaped to fit the hand of the user. A viewed both in side elevation and in plan the handle tapers toward the end 4, to provide a gouge-like formation suitable for removing cores of apples, for example. The arms 5 are formed by extending the side portions of the handle, and the arms, as well as the end portion of the handle adjacent thereto, are reinforced by a downwardly extending rib 15. The blade is likewise formed as a stamping, and is assembled between the arms by springing the arms apart.

What is claimed is:

1. In a peeler, a handle, a blade comprising two parallel spaced portions integrally united at their ends, the two portions being angularly related to provide a complementary V-shape as viewed in section, one of said portions having a knife edge directed toward the other portion, said other portion having a guide formation parallel to the knife edge, a projecting portion of a width less than the length of said guide portion integral with said guide portion and extending outwardly therefrom in a direction away from said knife portion and pivotally attached to said handle at its outer extremity whereby the axis about which the blade pivots is farther remote from the blade portion than the knife portion, and an end portion on said handle adapted to engage an outwardly projecting end of said guide portion to restrict swinging movement of the blade.

2. A peeler blade comprising a sheet metal stamping formed with two parallel portions united at their ends by end portions, one of said parallel portions being sharpened to provide a knife edge and the other portion being bent to provide guide means, and a projection extending from the midportion of said other portion, said projection having a width less than the length of the blade and extending from the guide portion in a direction away from the knife portion, said projection having aligned outwardly extending pivot pin portions at its extremity adapted for attachment to a handle.

CHARLES F. SENKEWITZ.